United States Patent
Yoshida et al.

(10) Patent No.: US 10,679,674 B2
(45) Date of Patent: Jun. 9, 2020

(54) EDITING METHOD AND RECORDING AND REPRODUCING DEVICE

(71) Applicant: Maxell, Ltd., Kyoto (JP)

(72) Inventors: Susumu Yoshida, Kawasaki (JP); Junji Shiokawa, Chigasaki (JP); Hiroo Okamoto, Yokohama (JP)

(73) Assignee: Maxell, Ltd., Kyoto (JP)

( * ) Notice: Subject to any disclaimer, the term of this patent is extended or adjusted under 35 U.S.C. 154(b) by 0 days.

(21) Appl. No.: 16/221,908

(22) Filed: Dec. 17, 2018

(65) Prior Publication Data

US 2019/0122700 A1 Apr. 25, 2019

Related U.S. Application Data

(63) Continuation of application No. 15/808,175, filed on Nov. 9, 2017, now Pat. No. 10,199,072, which is a (Continued)

(30) Foreign Application Priority Data

| Dec. 2, 2004 | (JP) | 2004-349264 |
| Dec. 28, 2004 | (JP) | 2004-378767 |
| Dec. 28, 2004 | (JP) | 2004-378768 |

(51) Int. Cl.
*H04N 9/80* (2006.01)
*G11B 27/00* (2006.01)
(Continued)

(52) U.S. Cl.
CPC .......... *G11B 27/102* (2013.01); *G06F 3/0482* (2013.01); *G11B 27/031* (2013.01);
(Continued)

(58) Field of Classification Search
USPC ....... 386/239, 240, 278, 280, 281, 282, 326, 386/353
See application file for complete search history.

(56) References Cited

U.S. PATENT DOCUMENTS

| 4,086,619 A | 4/1978 | Miyake et al. |
| 4,970,663 A | 11/1990 | Bedell et al. |

(Continued)

FOREIGN PATENT DOCUMENTS

| CA | 2 321 522 A1 | 9/1999 |
| CN | 1243596 A | 2/2000 |

(Continued)

OTHER PUBLICATIONS

Fandango Media, LLC's S.P.R. 2.5 Invalidity Contentions which were filed Mar. 26, 2018 in the following litigation: *Maxell, Ltd. v. Fandango Media, LLC*, Civil Action No. 2:17-cv-07534 AG-(SSx) (C.D. Cali.), filed Oct. 13, 2017.

(Continued)

*Primary Examiner* — Daquan Zhao
(74) *Attorney, Agent, or Firm* — Mattingly & Malur, PC

(57) ABSTRACT

In order to provide a recording and reproducing device that allows a user to select and manage arbitrary play lists, a unit of management for managing all registered play list information and an upper management hierarchical level are added. The unit of management is adapted to be handled on the same level with unified information that indicates a reproduction range of all AV data. User-defined unified information is adapted to be handled on the added management hierarchical level. The user-defined unified information is formed to allow arbitrary reproduction ranges contained on a lower hierarchical level to be registered.

30 Claims, 9 Drawing Sheets

Related U.S. Application Data continuation of application No. 15/176,435, filed on Jun. 8, 2016, now Pat. No. 9,818,449, which is a continuation of application No. 14/141,417, filed on Dec. 26, 2013, now Pat. No. 9,384,783, which is a continuation of application No. 12/567,898, filed on Sep. 28, 2009, now Pat. No. 8,644,684, which is a continuation of application No. 11/203,457, filed on Aug. 11, 2005, now Pat. No. 7,613,383.

(51) Int. Cl.

| | | |
|---|---|---|
| *G11B 27/10* | (2006.01) | |
| *G11B 27/034* | (2006.01) | |
| *G11B 27/34* | (2006.01) | |
| *H04N 5/76* | (2006.01) | |
| *H04N 9/87* | (2006.01) | |
| *G06F 3/0482* | (2013.01) | |
| *G11B 27/031* | (2006.01) | |
| *H04N 5/93* | (2006.01) | |
| *H04N 5/92* | (2006.01) | |
| *H04N 9/82* | (2006.01) | |

(52) U.S. Cl.
CPC ............ *G11B 27/034* (2013.01); *G11B 27/34* (2013.01); *H04N 5/76* (2013.01); *H04N 9/87* (2013.01); *G11B 2220/2562* (2013.01); *H04N 9/8205* (2013.01)

(56) References Cited

U.S. PATENT DOCUMENTS

| | | | | |
|---|---|---|---|---|
| 5,442,744 | A | 8/1995 | Piech et al. | |
| 5,616,876 | A | 4/1997 | Cluts | |
| 5,654,746 | A | 8/1997 | McMullan, Jr. et al. | |
| 5,704,051 | A | 12/1997 | Lane et al. | |
| 5,715,403 | A | 2/1998 | Stefik | |
| 5,734,823 | A | 3/1998 | Saigh et al. | |
| 5,751,282 | A | 5/1998 | Girard et al. | |
| 5,758,068 | A | 5/1998 | Brandt et al. | |
| 5,870,754 | A * | 2/1999 | Dimitrova | G06K 9/00744 |
| 5,884,056 | A | 3/1999 | Steele | |
| 5,900,868 | A * | 5/1999 | Duhault | H04N 5/45 348/564 |
| 5,917,488 | A * | 6/1999 | Anderson | G06F 16/54 715/838 |
| 5,930,446 | A * | 7/1999 | Kanda | G11B 27/034 386/282 |
| 5,974,219 | A * | 10/1999 | Fujita | G11B 27/034 386/290 |
| 5,999,173 | A * | 12/1999 | Ubillos | G11B 27/034 348/E5.056 |
| 6,005,579 | A | 12/1999 | Sugiyama et al. | |
| 6,020,930 | A | 2/2000 | Legrand | |
| 6,023,520 | A * | 2/2000 | Nagasaka | G11B 27/11 348/E5.067 |
| 6,157,744 | A * | 12/2000 | Nagasaka | G11B 27/034 382/236 |
| 6,166,735 | A | 12/2000 | Dom et al. | |
| 6,175,362 | B1 | 1/2001 | Harms et al. | |
| 6,181,870 | B1 | 1/2001 | Okada et al. | |
| 6,182,069 | B1 * | 1/2001 | Niblack | G06F 16/5838 |
| 6,219,837 | B1 | 4/2001 | Yeo et al. | |
| 6,236,971 | B1 | 5/2001 | Stefik et al. | |
| 6,243,725 | B1 | 6/2001 | Hempleman et al. | |
| 6,275,829 | B1 * | 8/2001 | Angiulo | G06F 16/958 |
| 6,289,165 | B1 * | 9/2001 | Abecassis | G11B 19/02 348/E5.105 |
| 6,301,586 | B1 * | 10/2001 | Yang | G06F 16/40 |
| 6,400,378 | B1 | 6/2002 | Snook | |
| 6,408,301 | B1 * | 6/2002 | Patton | G11B 27/002 707/741 |
| 6,452,609 | B1 * | 9/2002 | Katinsky | H04L 67/02 715/716 |
| 6,456,334 | B1 | 9/2002 | Duhault | |
| 6,470,140 | B1 | 10/2002 | Sugimoto et al. | |
| 6,480,669 | B1 | 11/2002 | Tsugumagari et al. | |
| 6,611,813 | B1 | 8/2003 | Bratton | |
| 6,646,655 | B1 | 11/2003 | Brandt et al. | |
| 6,724,403 | B1 | 4/2004 | Santoro et al. | |
| 6,734,909 | B1 | 5/2004 | Terane et al. | |
| 6,738,075 | B1 * | 5/2004 | Torres | G11B 27/034 348/333.05 |
| 6,754,548 | B1 | 6/2004 | Yoshii et al. | |
| 6,882,793 | B1 | 4/2005 | Fu et al. | |
| 6,934,964 | B1 | 8/2005 | Schaffer et al. | |
| 7,257,774 | B2 | 4/2007 | Denoue et al. | |
| 7,231,360 | B2 | 6/2007 | Sy | |
| 7,249,106 | B1 | 7/2007 | Tanabe et al. | |
| 7,281,220 | B1 * | 10/2007 | Rashkovskiy | H04N 5/44543 348/E5.104 |
| 7,443,418 | B2 * | 10/2008 | Bryant | G06Q 40/04 348/207.1 |
| 7,512,622 | B2 * | 3/2009 | Volk | G06F 3/0484 707/999.104 |
| 7,565,675 | B2 | 7/2009 | Sincaglia et al. | |
| 7,594,177 | B2 * | 9/2009 | Jojic | G06F 16/745 715/720 |
| 7,610,306 | B2 * | 10/2009 | Lin | G06F 16/5838 |
| 7,613,383 | B2 * | 11/2009 | Yoshida | G11B 27/034 386/248 |
| 7,639,943 | B1 * | 12/2009 | Kalajan | G03B 29/00 396/429 |
| 7,640,514 | B2 * | 12/2009 | Camara | G06F 3/0481 715/719 |
| 7,715,690 | B1 * | 5/2010 | Nomura | G11B 27/034 348/564 |
| 7,853,893 | B2 * | 12/2010 | Muller | G06Q 20/10 715/810 |
| 7,974,511 | B2 * | 7/2011 | Mikawa | H04N 5/772 386/200 |
| 8,036,516 | B2 * | 10/2011 | Matsumoto | G11B 19/025 348/14.14 |
| 8,238,713 | B2 * | 8/2012 | Barde | G11B 27/105 386/239 |
| 8,291,444 | B1 | 10/2012 | Newell | |
| 8,549,553 | B2 * | 10/2013 | Barton | G11B 27/105 725/28 |
| 2001/0009007 | A1 | 7/2001 | Miyamae et al. | |
| 2001/0023436 | A1 * | 9/2001 | Srinivasan | G11B 27/031 709/219 |
| 2001/0037379 | A1 | 11/2001 | Livnat | |
| 2001/0041049 | A1 * | 11/2001 | Kanda | G11B 27/034 386/282 |
| 2001/0052127 | A1 | 12/2001 | Seo et al. | |
| 2001/0056434 | A1 * | 12/2001 | Kaplan | G06F 16/40 |
| 2002/0049979 | A1 | 4/2002 | White et al. | |
| 2002/0056098 | A1 | 5/2002 | White | |
| 2002/0069418 | A1 | 6/2002 | Phillips | |
| 2002/0166122 | A1 | 11/2002 | Kikinis et al. | |
| 2002/0180803 | A1 * | 12/2002 | Kaplan | H04L 29/06027 715/810 |
| 2003/0005442 | A1 * | 1/2003 | Brodersen | G11B 27/034 725/44 |
| 2003/0063897 | A1 | 4/2003 | Jung-Kwon | |
| 2003/0088646 | A1 | 5/2003 | Yeo | |
| 2003/0090504 | A1 * | 5/2003 | Brook | G11B 27/034 715/716 |
| 2003/0093790 | A1 | 5/2003 | Logan et al. | |
| 2003/0122861 | A1 | 7/2003 | Jun et al. | |
| 2003/0149988 | A1 | 8/2003 | Ellis | |
| 2004/0001106 | A1 * | 1/2004 | Deutscher | G06F 16/40 715/838 |
| 2004/0021669 | A1 * | 2/2004 | Fredlund | G06F 1/1601 345/530 |
| 2004/0068606 | A1 | 4/2004 | Kim et al. | |
| 2004/0078383 | A1 | 4/2004 | Mercer et al. | |
| 2005/0094031 | A1 * | 5/2005 | Tecot | G11B 27/105 348/473 |

(56) References Cited

U.S. PATENT DOCUMENTS

| | | | |
|---|---|---|---|
| 2005/0193416 A1 | 9/2005 | Przybylek | |
| 2006/0048057 A1* | 3/2006 | Herberger | G11B 27/034 |
| | | | 715/723 |
| 2006/0064716 A1* | 3/2006 | Sull | G11B 27/105 |
| | | | 725/37 |
| 2006/0093309 A1* | 5/2006 | Herberger | G11B 27/034 |
| | | | 386/280 |
| 2006/0107289 A1 | 5/2006 | Deyonker et al. | |
| 2006/0168147 A1 | 7/2006 | Inour et al. | |
| 2006/0212455 A1* | 9/2006 | Perry | G06F 16/58 |
| 2007/0022382 A1* | 1/2007 | Honkaniemi | G06F 16/954 |
| | | | 715/733 |
| 2007/0220580 A1 | 9/2007 | Putterman et al. | |
| 2008/0092168 A1* | 4/2008 | Logan | G10H 1/0033 |
| | | | 725/44 |
| 2009/0129740 A1* | 5/2009 | O'brien | G11B 27/034 |
| | | | 386/278 |

FOREIGN PATENT DOCUMENTS

| | | |
|---|---|---|
| EP | 1 058 257 A1 | 12/2000 |
| JP | 11-32301 A | 2/1999 |
| JP | 2000-152180 A | 5/2000 |
| JP | 2002-150503 A | 5/2002 |
| JP | 2002-197806 A | 7/2002 |
| JP | 2003-36652 A | 2/2003 |
| JP | 2003-100055 A | 4/2003 |
| JP | 2003-123389 A | 4/2003 |
| JP | 2004-192779 A | 7/2004 |
| WO | 97/25798 A1 | 7/1997 |
| WO | 99/48296 A1 | 9/1999 |

OTHER PUBLICATIONS

Ponceleon, D. et al., "Key to Effective Video Retrieval: Effective Cataloging and Browsing", 1998, pp. 99-107.

Srinivasan, S. et al., "What is in that Video Anyway?", 1999, pp. 388-393.

Pollack, W., "Tuning In: The Future of Copyright Protection for Online Music in the Digital Millennium", Fordham Law Review, 2000, pp. 2445-2488, vol. 68, Issue 6.

LG Electronics U.S.A., Inc. et al., "Zenith Installation and Operating Guide | Warranty" for DVR413 DVD Recorder, May 13, 2004.

Wactlar, H. D. et al., "Lessons Learned from Building a Terabyte Digital Video Library", IEEE, 1999, pp. 66-73.

Japan Patent Office (JPO) office action for JPO patent application JP2008-268104 (dated Jun. 12, 2009).

Japan Patent Office (JPO) office action for JPO patent application JP2004-349264 (dated Aug. 6, 2008).

Chinese Intellectual Property Office (SIPO) office action for SIPO patent application CN2005-100935522 (dated May 26, 2008).

Toshiba HDD & DVD Video Recorder Instruction Manual RD-X5 Operating Instructions, Toshiba Corporation, pp. 148-159 (2004).

Office action for Japan Patent Office patent application JP2008-31843 (dated Dec. 21, 2010).

Central District of California Case No. 2:17-cv-7534.

Central District of California Case No. 2:17-cv-7538.

*Fandango Media, LLC* v. *Maxell, Ltd.*, Petition for Inter Partes Review of U.S. Pat. No. 9,384,783, Inter Partes Review No. IPR2018-01432 Final Written Decision entered Feb. 10, 2020.

* cited by examiner

EDITING METHOD AND RECORDING AND REPRODUCING DEVICE

CROSS-REFERENCE TO RELATED APPLICATIONS(S)

This is a continuation application of U.S. patent application Ser. No. 15/808,175, filed Nov. 9, 2017, which is a continuation application of U.S. patent application Ser. No. 15/176,435, filed Jun. 8, 2016, now U.S. Pat. No. 9,818,449, which is a continuation of U.S. patent application Ser. No. 14/141,417, filed Dec. 26, 2013, now U.S. Pat. No. 9,384,783 (the entire disclosure of which is incorporated herein by reference for all purposes), which is a continuation of U.S. patent application Ser. No. 12/567,898, filed Sep. 28, 2009, now U.S. Pat. No. 8,644,684 (the entire disclosure of which is incorporated herein by reference for all purposes), which is a continuation of U.S. patent application Ser. No. 11/203,457, filed on Aug. 11, 2005, now U.S. Pat. No. 7,613,383 (the entire disclosure of which is incorporated herein by reference for all purposes), which application claims priority from Japanese Patent Application Nos. JP2004-349264, filed Dec. 2, 2004, JP2004-378767, filed Dec. 28, 2004, and JP2004-378768, filed Dec. 28, 2004, the entire disclosures of which are incorporated herein by reference for all purposes.

BACKGROUND OF THE INVENTION

Field of the Invention

The present invention relates to a recording and reproducing device which records data onto a recording medium and reproduces data from the recording medium.

Description of the Related Art

As the high-efficiency coding technique advances, it has become possible to handle AV data such as video data and audio data as digital data, conduct code rate compression, and record resultant data on a large-capacity recording medium such as a hard disk or a recording type optical disk in real time. When digital data already compressed in code rate is inputted to a recording and reproducing device having such a recording medium from outside by broadcasting or communication, it is also possible to record the digital data on the recording medium intact.

In these recording and reproducing device, management information for managing digital data to be recorded is generated and recorded together onto the same recording medium. When a rewritable recording medium is used, the user can conduct editing work on the recording and reproducing device by rewriting the management information and generating and manipulating a list indicating the reproduction sequence (hereinafter referred to as play list) (see, for example, JP-A-2000-152180).

SUMMARY OF THE INVENTION

In the above-described conventional technique, it is mentioned that the play list indicates the reproduction sequence by linking portions of AV data together. As an example, a management state of AV data on a recording medium in the above-described conventional technique is shown in FIG. 2.

Reference numeral 201 designates AV data themselves on the recording medium. The case where a program #1 to a program #3 are present as recording units is shown. Reference numeral 202 designates a second management hierarchical level (management level 2) in management information. Original cell information #1 to original cell information #3 indicate the whole reproduction range of program units, i.e., a program #1 to a program #3, respectively. Each of user-defined cell information #1 to user-defined information #2 indicates a reproduction range of the whole or a part of a program arbitrarily specified by the user. The number of the user-defined cell information #1 to user-defined information #2 is increased or decreased by the user's editing manipulation. Reference numeral 203 designates a first management hierarchical level (management level 1). Program information contains all of the original cell information #1 to original cell information #3. By conducting reproduction on the basis of the program set information, the user can reproduce all AV data recorded on the recording medium. Play list information #1 to play list information # k indicate a reproduction sequence of the user-defined cell information arbitrarily specified by the user. It is possible to have a plurality of reproduction sequences. Inside of a frame 204 becomes original information for managing the whole AV data in the management information. Inside of a frame 205 becomes user-defined information for managing the play list obtained by the user's editing manipulation.

In FIG. 2, the play list information is placed on the same level with the program set information and managed as the management level 1. Therefore, the sequence of a plurality of play list information pieces themselves is determined uniquely. For example, as for a catalog of the play lists, it is impossible on the user's interface to alter the display sequence. In view of the problem, the present invention has been achieved. An object of the present invention is to provide a recording scheme and device in which the user can conduct manipulation of arbitrarily rearranging the display sequence of the play lists in the play list catalog on the user interface.

Furthermore, in the conventional technique example, attention is not paid to that a plurality of users generate, select and manage favorite play list information. For example, even when a plurality of users desire to generate, select and manage respective favorite play list information pieces, it cannot be implemented. Furthermore, attention is not especially paid to that a user select some arbitrary play lists from among a plurality of play lists and manage them.

In view of these problems, the present invention has been achieved. An object of the present invention is to provide a recording and reproducing device in which the user can select and manage arbitrary play lists.

In order to achieve the objects, in accordance with the present invention, a unit of management for managing all registered play list information and an upper management hierarchical level are added. The unit of management is adapted to be handled on the same level with unified information that indicates a reproduction range of all AV data. User-defined unified information is adapted to be handled on the added management hierarchical level. The user-defined unified information is formed to allow arbitrary reproduction ranges contained on a lower hierarchical level to be registered.

In a recording and reproducing device according to the present invention, it becomes possible for the user to select arbitrary play lists or reproduction ranges and conduct management. Even in the case where a plurality of users share a single recording medium, therefore, each user can manage favorite reproduction contents, resulting in improved usage. Since the play lists are subject to unified management, it becomes possible for the user to arbitrarily alter the display sequence of play lists.

According to the present invention, a recording and reproducing device improved in usage can be provided.

Other objects, features and advantages of the invention will become apparent from the following description of the embodiments of the invention taken in conjunction with the accompanying drawings.

DESCRIPTION OF THE EMBODIMENTS

Figure 1:
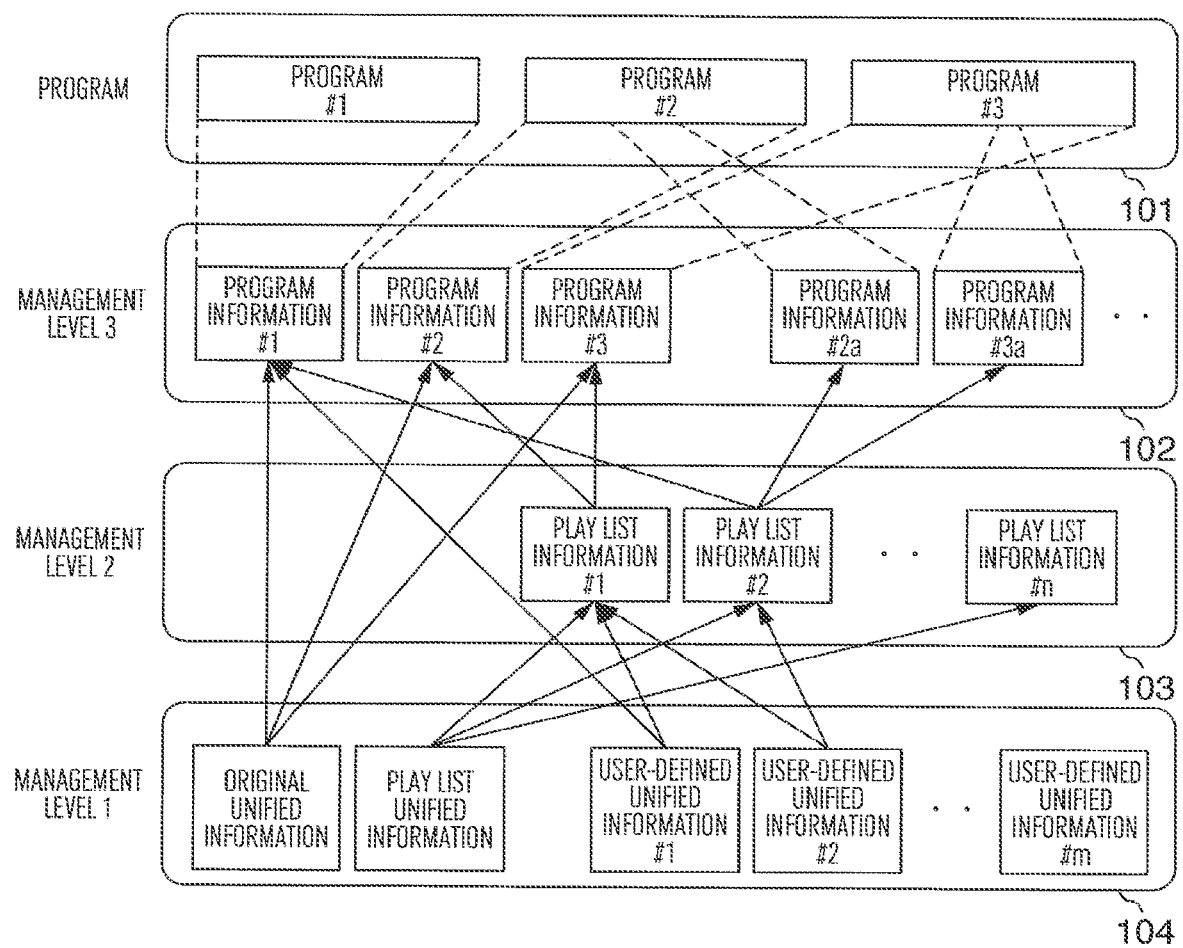
FIG. 1 shows a management state of AV data in a recording and reproducing device according to an embodiment of this invention.

Hereafter, embodiments of the present invention will be described with reference to the drawings. FIG. 1 shows a management state of AV data on a recording medium in a recording and reproducing device according to the present invention. In the same way as the reference numeral 201 in FIG. 2, reference numeral 101 designates AV data themselves on the recording medium. The case where programs #1 to #3 are present as recording units is shown.

Figure 2:
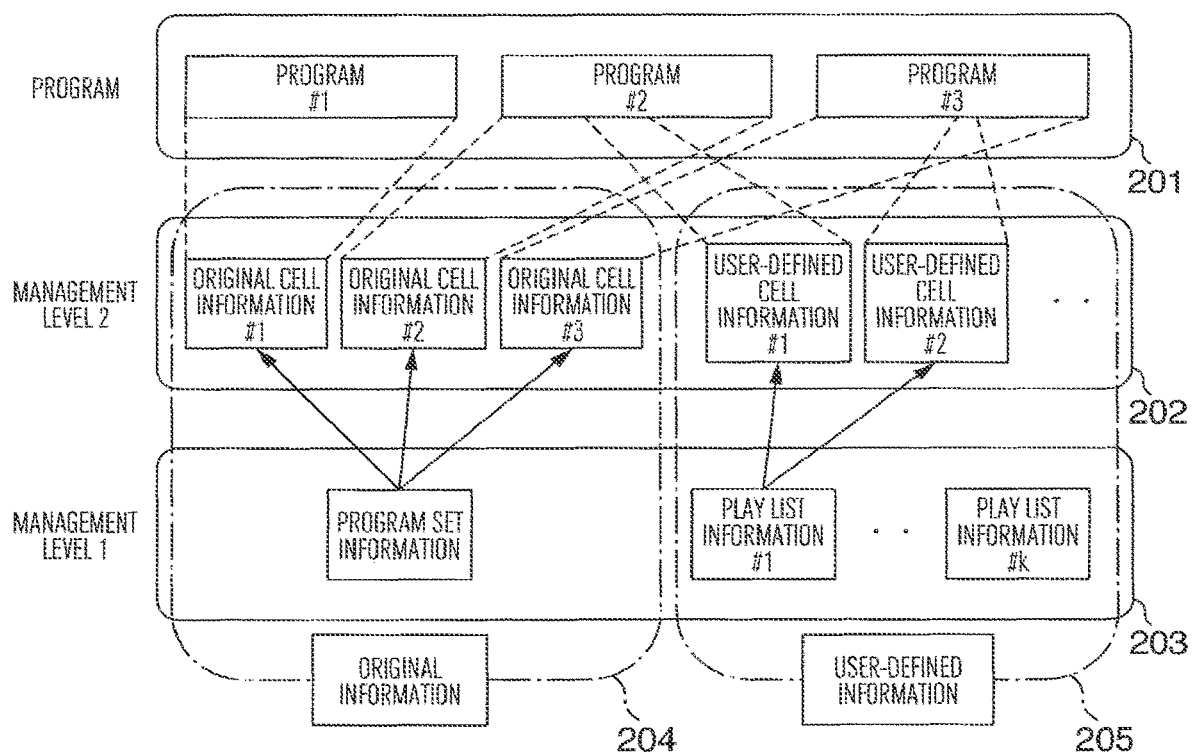
FIG. 2 shows a management state of AV data in a conventional technique example.

Reference numeral 102 corresponds to 202 in FIG. 2. However, reference numeral 102 designates a third management hierarchical level (management level 3) in management information. Program information #1 to program information #3 indicate the whole reproduction ranges of program units, i.e., program #1 to program #3, respectively. Each of program information #2a to program information #3a indicates a reproduction range of the whole or a part of a program arbitrarily specified by the user. The program information #2a to program information #3a indicate a part of the program #2 and a part of the program #3, respectively. In places corresponding to the program information #1 to program information #3, information is also added, as AV data is added, i.e., with an increase in programs. In places corresponding to the program information #2a to the program information #3a, the number of information pieces increases or decreases due to the editing manipulation of the user.

Reference numeral 103 corresponds to the management level 1 in FIG. 2. However, numeral 103 designates a second management hierarchical level (management level 2), which includes only play list information #1 to play list information # n. Each play list information indicates a reproduction sequence of arbitrary program information pieces on the management level 3. It is possible to have a plurality of reproduction sequences.

Reference numeral 104 designates a newly added first management hierarchical level (management level 1) in the management information as a feature point of the present invention. The management level 1 includes a plurality of unified information pieces. Original unified information corresponds to the program set information shown in FIG. 2. The original unified information contains all of the program information #1 to program information #3 on the management level 3. By conducting reproduction on the basis of all of the program information #1 to program information #3, it becomes possible for the user to reproduce all AV data recorded on the recording medium. Play list unified information contains all of the play list information #1 to play list information # n on the management level 2. By conducting reproduction on the basis of all of the play list information #1 to play list information # n on the management level 2, it becomes possible for the user to successively reproduce all registered play lists. User-defined unified information #1 to user-defined unified information # m contain arbitrary one or more from among play list information pieces on the management level 2 and program information pieces on the management level 3. For example, when a plurality of users use a single recording medium, it becomes possible to manage reproduced contents that meet respective users' tastes by using one user-defined unified information every user.

An embodiment of a recording and reproducing device according to the present invention will be described more specifically by using another drawing.

Figure 3:
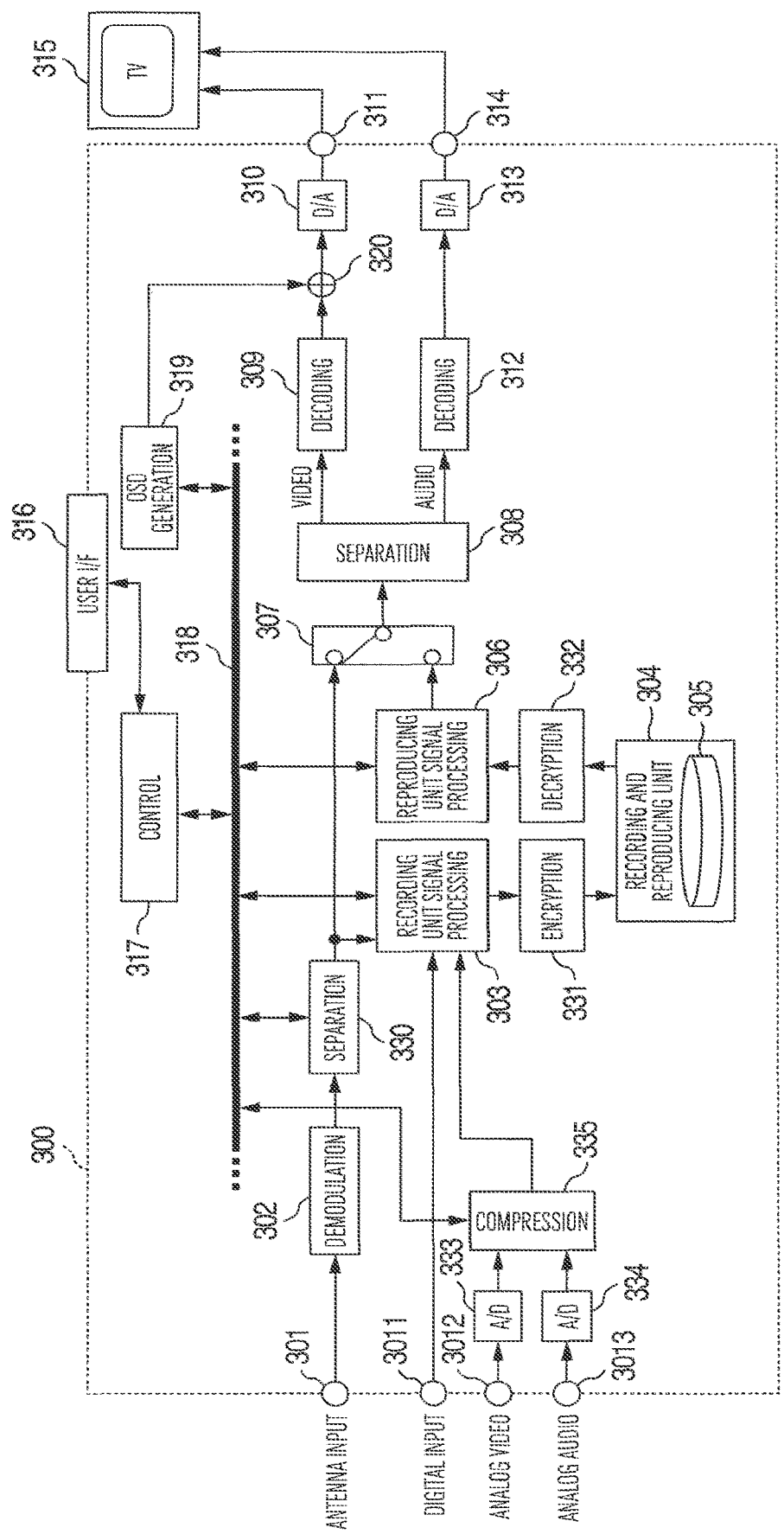
FIG. 3 shows a block diagram of a recording and reproducing device according to an embodiment of this invention.

FIG. 3 is a block diagram showing an example of a recording and reproducing device according to the present invention. A recording and reproducing device capable of receiving digital broadcast, recording the digital broadcast on a recording medium, reproducing recorded data, and obtaining a reproduced output is shown. Reference numeral 300 designates a recording and reproducing device, 301 an input terminal supplied with a received wave from an antenna, 3011 an input terminal supplied with compressed video and audio data from another device, 3012 an analog video input terminal supplied with an analog video signal, 3013 an analog audio input terminal supplied with an analog audio input terminal, 333 and 334 analog/digital (A/D) conversion circuits each of which converts an analog signal to a digital signal, 302 a demodulation circuit, 330 a separation circuit which separates the demodulated digital signal into audio, video and other data, 335 a compression circuit which compresses digitized video and audio signals, 303 a recording unit signal processing circuit, 331 an encryption circuit which encrypts data to be recorded. 304 a recording and reproducing unit including a drive function of a recording medium, 305 a recording medium, 332 a decryption circuit which decrypts data encrypted and recorded on the recording medium, 306 a reproducing unit signal processing circuit, 307 a switchover circuit, 308 a separation circuit, 309 a video decoding circuit, 310 a digital/analog (D/A) conversion circuit, 311 a video output terminal, 312 an audio decoding circuit, 313 a D/A conversion circuit, 314 an audio output terminal, 315 a TV set, 316 a user I/F, 317 a control unit, 318 a system bus, 319 an OSD generation unit, and 320 an addition circuit.

At the time of recording, a signal transmitted by digital broadcast or the like and received is demodulated in the demodulation circuit 302 by using a predetermined scheme, subjected to necessary signal processing such as timing adjusting data addition and modulation in the recording unit signal processing circuit 303, encrypted in the encryption circuit 331, and then recorded on the recording medium 305 by the recording and reproducing unit 304. A digital signal input from the digital input terminal 3011 is subjected to necessary signal processing such as timing adjusting data addition and modulation in the recording unit signal processing circuit 303, encrypted in the encryption circuit 331, and then recorded on the recording medium 305 by the recording and reproducing unit 304. An analog video signal input from the analog video input terminal 3012 and an analog audio signal input from the analog audio input terminal 3013 are subjected to compression processing in the compression circuit 335, encrypted in the encryption circuit 331 via the recording unit signal processing circuit 303, and then recorded on the recording medium 305 by the recording and reproducing unit 304.

At the time of reproducing, encrypted digital data read out from the recording medium 305 via the recording and reproducing unit 304 in accordance with the user's order is decrypted in the decryption circuit 332, subjected to signal processing required for reproduction such as demodulation in a form based on a predetermined modulation scheme in the reproducing unit signal processing circuit 103, and sent to the separation circuit 308 via the switchover circuit 307. Resultant video digital data is subjected to predetermined video decoding processing in the video decoding circuit 309, converted to an analog signal in the D/A conversion circuit 310, and then displayed as a monitor output on the TV set 315 via the video output terminal 311. Audio digital data obtained from the separation circuit 308 is subjected to predetermined audio decoding processing in the audio decoding circuit 312, converted to an analog signal in the D/A conversion circuit 313, and then outputted by an audio output mechanism in the TV set 315 via the audio output terminal 314.

The control unit 317 controls various components in the recording and reproducing device 300 via the system bus 318. Furthermore, the control unit 317 controls the whole device to cause operation based on the user's order input which is inputted via the user I/F 316 to be conducted. By the way, an order input request to the user or necessary OSD display for the user is implemented by preparing it in the OSD generation unit 319, adding it to an output of the video decoding circuit 309 on a suitable level, and finally outputting it to a monitor screen on the TV set 315.

The case where each unified information on the management level 1 is used for menu display of recording data will now be described as a specific use example of the management information configuration in FIG. 1.

Figure 4:
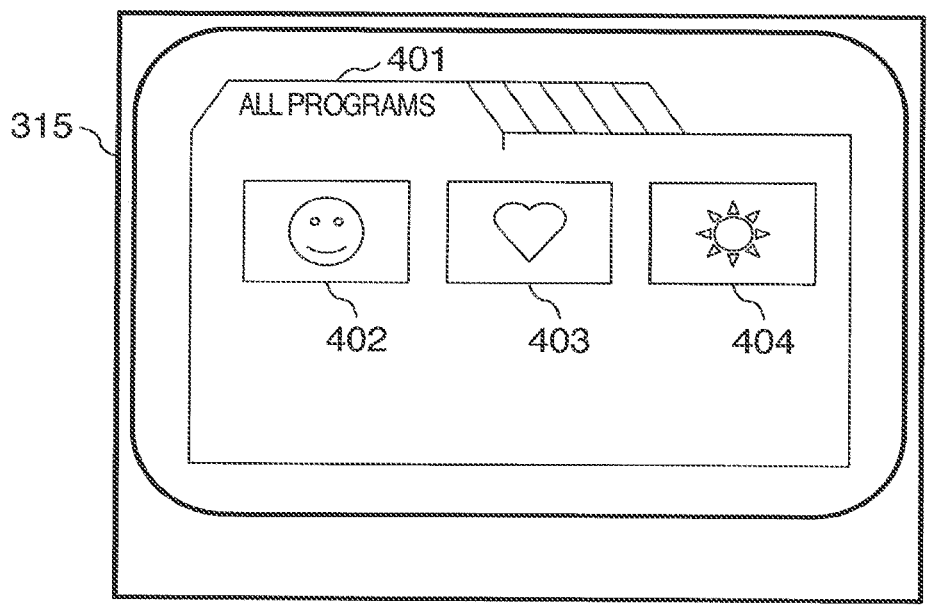
FIG. 4 shows a display output example of original unified information.

FIG. 4 shows an example in which menu display is conducted by using the original unified information shown in FIG. 1. Reference numeral 315 designates the TV set shown in FIG. 3, 401 a tag for displaying all programs, 402 a thumbnail indicating program information #1, 403 a thumbnail indicating program information #2, and 404 a thumbnail indicating program information #3. The user moves a cursor position on the screen to a desired thumbnail and conducts selection and determination by using a remote controller or the like. As a result, the user can reproduce arbitrary programs or all programs.

Figure 5:
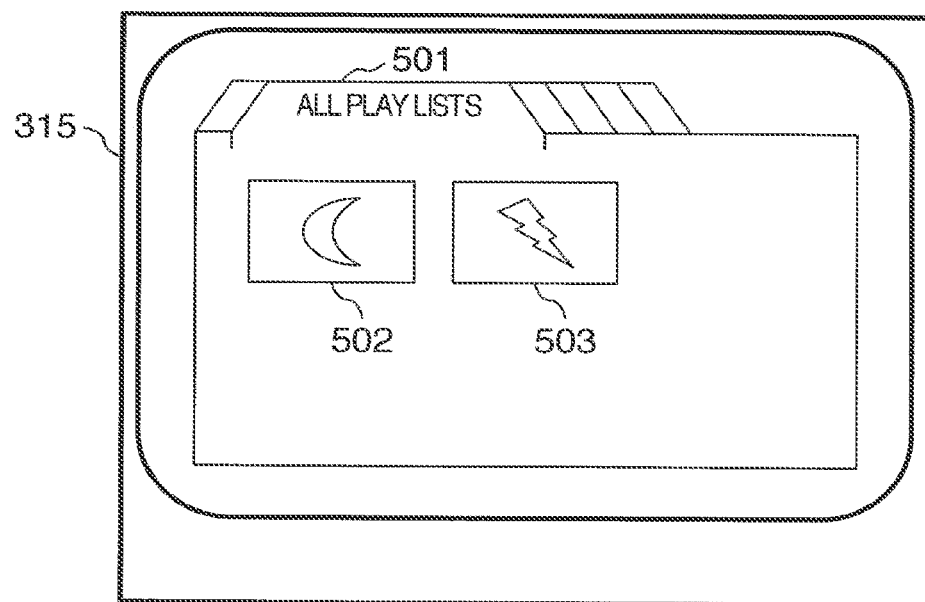
FIG. 5 shows a display output example of play list unified information.

FIG. 5 shows an example in which menu display is conducted by using the play list unified information shown in FIG. 1. Reference numeral 501 designates a tag for displaying all play lists, 502 a thumbnail indicating play list information #1, and 503 a thumbnail indicating play list information #2. In the same way as the above-described case, the user moves a cursor position on the screen to a desired thumbnail and conducts selection and determination by using a remote controller or the like. As a result, the user can reproduce arbitrary play lists or all play lists. By the way, display switching from the all program display tag 401 to all play list display tag can be implemented by, for example, movement of the cursor in tag character positions conducted by the user.

Figure 6:
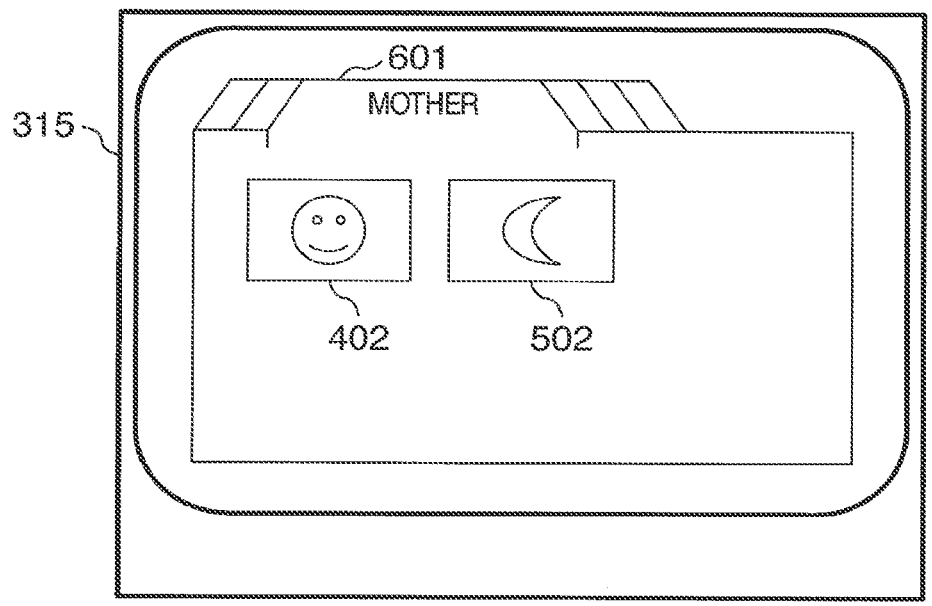
FIG. 6 shows a first output example of user-defined unified information.
Figure 7:
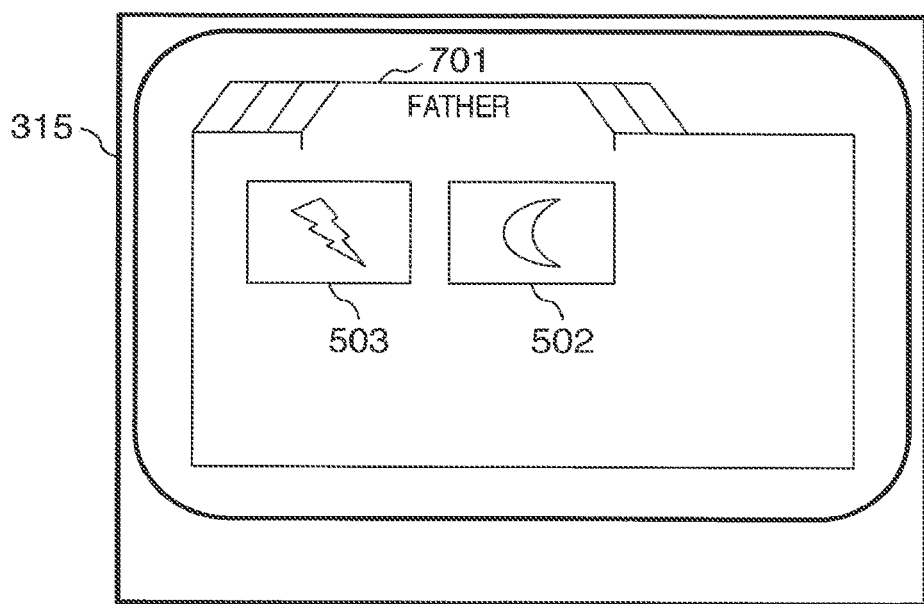
FIG. 7 shows a second output example of user-defined unified information.

FIG. 6 shows an example in which menu display is conducted by using the user-defined unified information #1 shown in FIG. 1. Reference numeral 601 designates a menu display tag for user #1 (who is supposed to be "mother" here). As appreciated from FIG. 1, reference numerals 402 and 502 designate thumbnails indicating the program information #1 and the play list information #1, respectively. The "mother" can use the menu display tag for mother 601 as a folder dedicated to herself, and freely register and delete data to be reproduced. In the same way, FIG. 7 shows an example in which menu display is conducted by using the user-defined unified information #2 shown in FIG. 1. Reference numeral 701 designates a menu display tag for user #2 (who is supposed to be "father" here). As appreciated from FIG. 1, reference numerals 503 and 502 designate thumbnails indicating the play list information #2 and the play list information #1, respectively. In this case, the "father" selects two play lists. However, the reproduction sequence of them can be altered. In the same way as the "mother," the "father" can use the menu display tag for father 701 as a folder dedicated to himself, and freely register and delete data to be reproduced.

As heretofore described, in the embodiment of the present invention, a unit of management for managing all registered play list information and an upper management hierarchical level are added. The unit of management is adapted to be handled on the same level with unified information that indicates a reproduction range of all AV data. User-defined unified information is adapted to be handled on the added management hierarchical level. The user-defined unified information is formed to allow arbitrary reproduction ranges contained on a lower hierarchical level to be registered therein. As a result, it becomes possible for the user to select arbitrary play lists or reproduction ranges and conduct management. Even in the case where a plurality of users share a single recording medium, therefore, each user can manage favorite reproduction contents, resulting in improved usage.

In the embodiment heretofore described, the case where digital broadcast is received and digital data is recorded intact has been described. However, this is not restrictive. A configuration having a network I/F to acquire AV data from an external network or having coding unit to conduct recording onto the recording medium while coding analog data may also be used. In other words, the present embodiment refers to data management on the recording medium, and its input route is not especially restricted.

Figure 8:
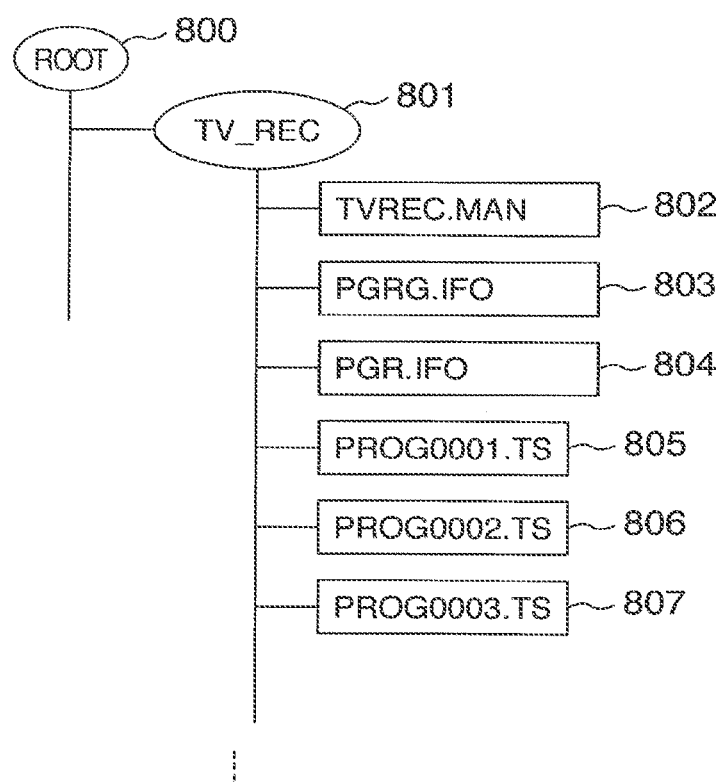
FIG. 8 shows an example of a file structure of original unified information, play list unified information, user-defined unified information, play list information, program information, and AV data (program)

FIG. 8 shows an example of file configurations used to actually record the program, program information, play list information, original unified information, play list unified information, and user-defined information on the recording medium 305 (FIG. 3). The recording medium is a medium on which digital recording and reproducing are conducted. Files on the medium are managed by a file system similar to that used to manage a recording medium in the so-called personal computer or the like. In FIG. 8, "ROOT" 800 represents a highest hierarchical level of a file directory. "TV_REC" 801 is a directory under the highest hierarchical level. "TVREC.MAN" 802, "PGRG.IFO" 803, "PGR.IFO" 804, "PROG0001.TS" 805, ••• of files which implement the management structure shown in FIG. 1 according to the present invention are recorded in the "TV_REC" 801. In the "TVREC.MAN" 802, the original unified information, the play list unified information, and the user-defined unified information #1 to # m on the management level 1 shown in FIG. 1 are described as management tables. In the "PGRG.IFO" 803, the play list information #1 to the play list information # n on the management level 2 shown in FIG. 1 are recorded as management tables. In the "PGR.IFO" 804, the program information #1 to the program information #3a on the management level 3 shown in FIG. 1 are recorded as management tables. "PROG0001.TS" 805, "PROG0002.TS" 806 and "PROG0003.TS" 807 are entity files of AV data in each program. For example, AV data between recording start and recording end of one time is recorded in the "PROG0001.TS." AV data between recording start and recording end of the next time is recorded in the "PROG0002.TS." In this way, the file name is updated and recording is conducted. Thereafter, the management files 802 to 804 are updated.

The file structure and the configuration of management tables themselves concerning the management structure "TVREC.MAN" 802, "PGRG.IFO" 803, "PGR.IFO" 804, "PROG0001.TS" 805, ••• of files may be formed by using any method. However, an example of how to implement the management configuration in the case of FIG. 1 using the files will now be described.

Figure 9:
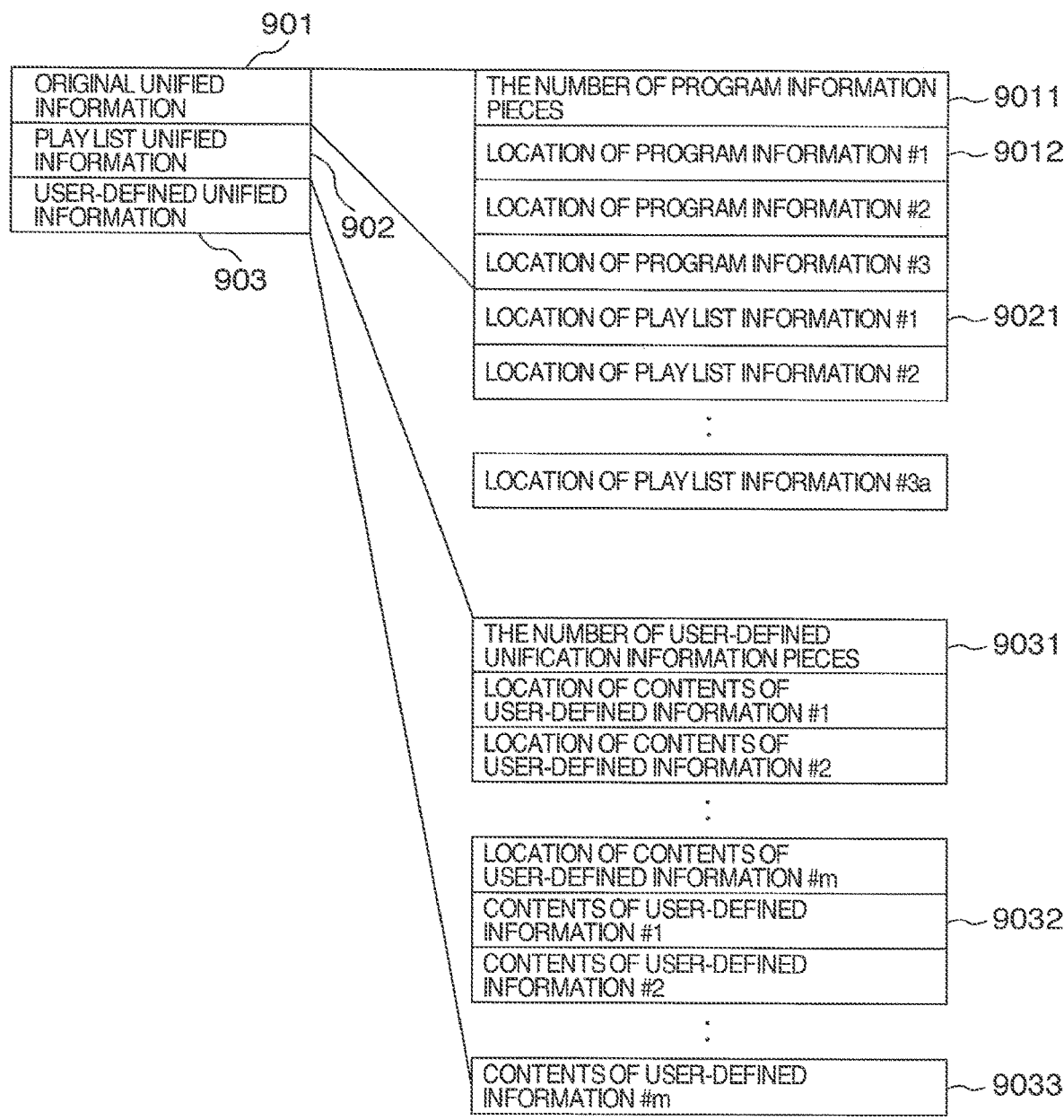
FIG. 9 shows an example of a management table structure of original unified information, play list unified information, and user-defined unified information.

FIG. 9 shows a configuration of management tables of the "TVREC.MAN" 802 (FIG. 8). As original unified information 901, the number of AV data recorded as the number of program information pieces 9011, i.e., the total number (three in this case) of entity files ("PROG0001.TS" 805, "PROG0002.TS" 806 and "PROG0003.TS" 807) of the AV data is described. Under the original unified information 901, location tables 9012 of respective original program information pieces are recorded. As play list unified information 902, play list location information tables are recorded in 9021 and subsequent tables. In 9031, the number of user-defined unified information pieces is recorded. After that, contents of #1 to # m of the user-defined information are recorded.

Figure 13:
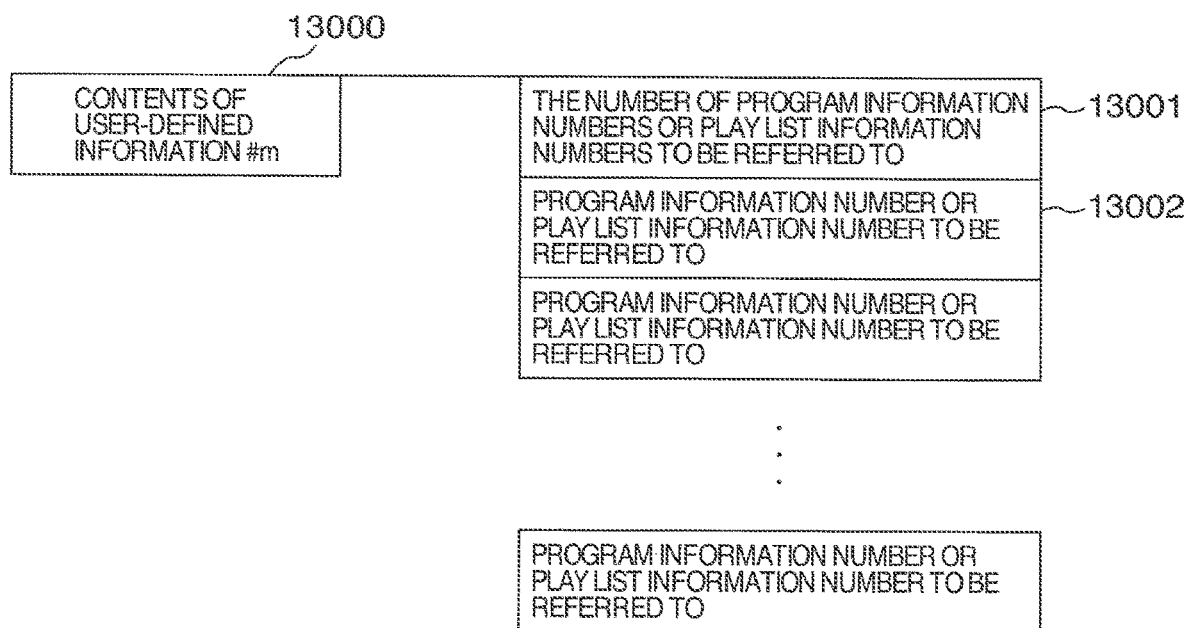
FIG. 13 shows an example of a table indicating contents of user-defined information # m.

FIG. 13 shows contents of the user-defined information # m described above. The user-defines information # m has combinations of original program information and play list information as a table.

Figure 10:
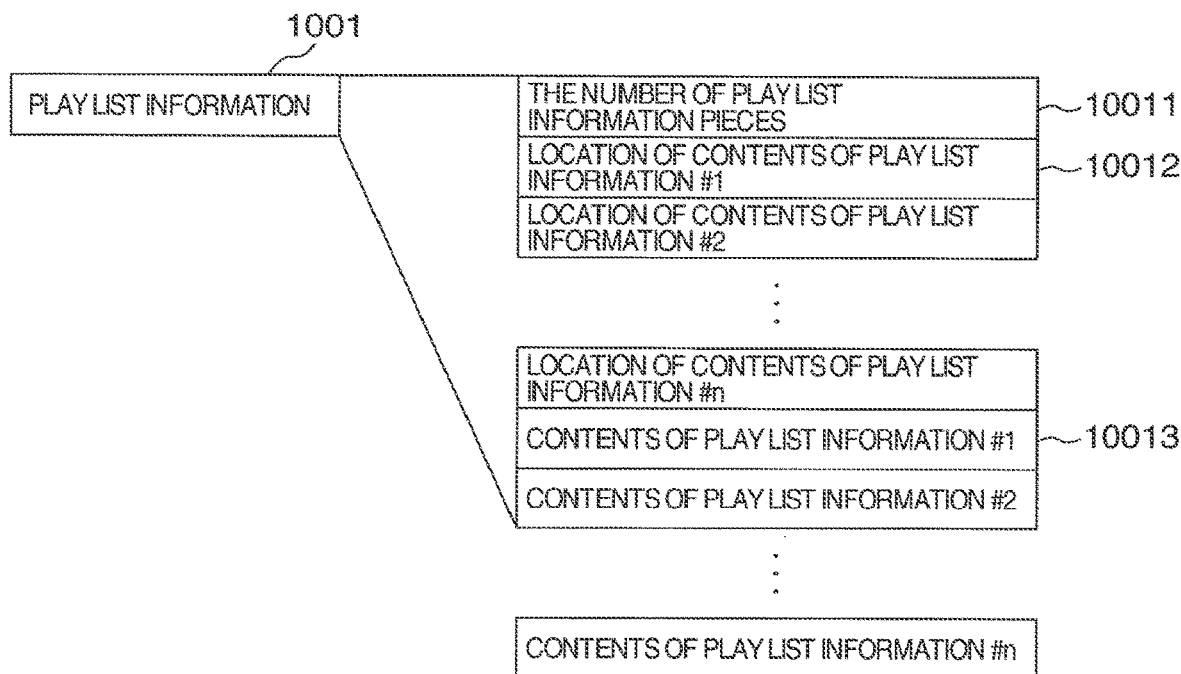
FIG. 10 shows an example of a management table of play list information.

FIG. 10 shows a management table of the "PGRG.IFO" 803 (FIG. 8), which corresponds to the management level 2 shown in FIG. 1. As play list information 1001, the total number of the play list information pieces is first described as designated by 10011. (In this case, the total number of the play list information pieces is n.) Beginning with 10012 indicated under the reference numeral 10011, locations in which contents of the play list information #1 to # n are described are recorded as tables. Beginning with 10013, contents of the play list information #1 to # n (contents of the reproduction sequence, which are management tables having combinations of program information indicating the reproduction start location and reproduction end location of AV data described later) are recorded.

Figure 11:
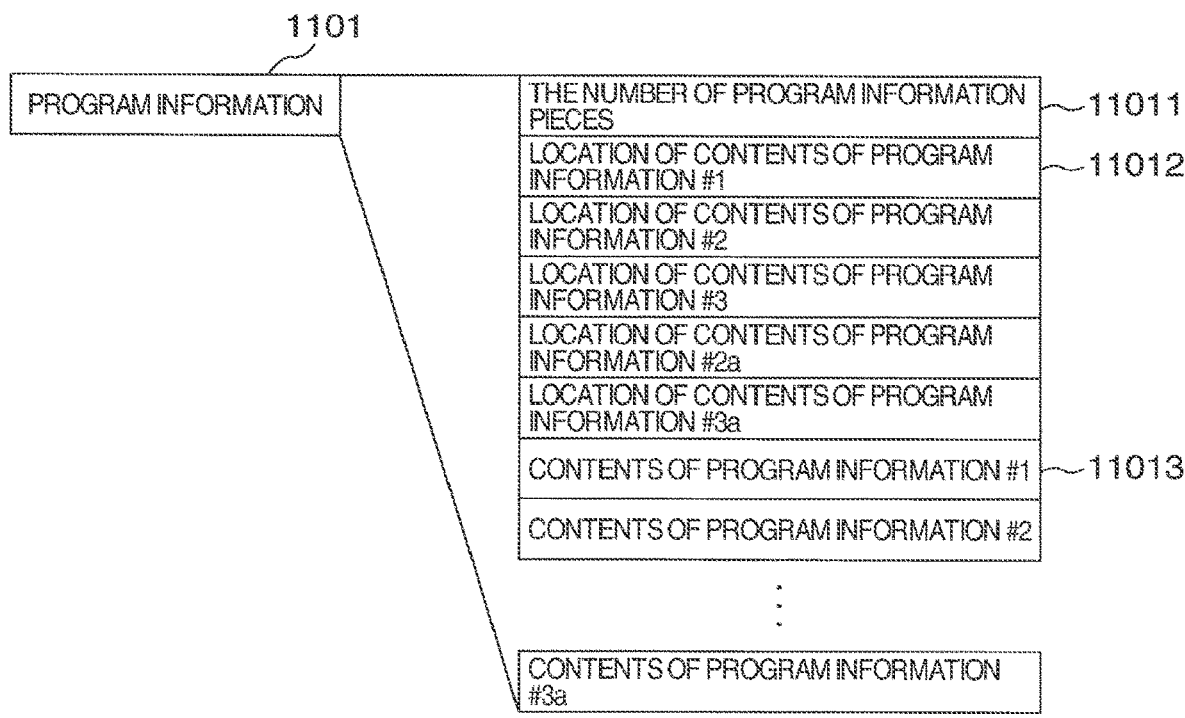
FIG. 11 shows an example of a management table of program list information.

FIG. 11 shows a management table of the "PGR.IFO" 804 (FIG. 8), which corresponds to the management level 3 shown in FIG. 1. As program information 1101, the total number of the program information pieces including all of the program information pieces paired with the original information program #1, #2 and #3 (FIG. 1) and the user-defined program information #2a and #3a (FIG. 1) is recorded as designated by 11011. Beginning with 11012 indicated under the reference numeral 11011, tables indicating locations in which contents of the program information #1 to #3a are described are recorded. Beginning with 11013, contents of the program information #1 to #3a (describing the reproduction start location and reproduction end location of the "PROG0001.TS" 805, "PROG0002.TS" 806 and "PROG0003.TS" 807 (FIG. 8)) are recorded.

Figure 12:
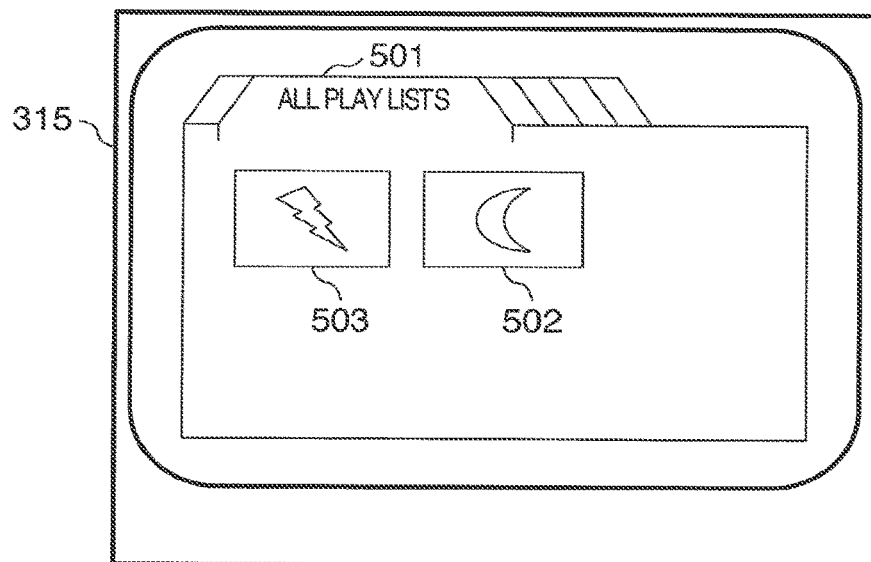
FIG. 12 shows a display output example of play list unified information.

By conducting the management as heretofore described, it becomes possible to sort the location information, for example, in the play list location table 9021 and alter the sequence of displaying play lists on a GUI view from the state shown in FIG. 5 to the state shown in FIG. 12. In the case where the number of play lists has become very large, a play list that is high in user's use frequency can be displayed in the first place in the GUI view. As a result, it is possible to implement a usable recording and reproducing device, reproducing device, or recording method. For example, a plurality of users can set play lists that they want to view and recorded original contents freely and individually. Even when the number of recorded programs is very large, the user can rapidly find out a program that the user wants to view, because the user can refer to a folder defined by the user.

In the present embodiment, a clear distinction is made between the user-defined play list unified information and the user-defined unified information #1 to # m. The user-defined play list unified information may be defined as user-defined play list unified information having no link to the original program information of the user-defined unified information.

It should be further understood by those skilled in the art that although the foregoing description has been made on embodiments of the invention, the invention is not limited thereto and various changes and modifications may be made without departing from the spirit of the invention and the scope of the appended claims.

What is claimed is:
1. An information processing apparatus comprising:
a network interface;
a recording medium on which is stored a plurality of video information including first video information received wirelessly by the network interface over a network from another information processing apparatus, wherein at least some of the plurality of video information is associated with a user profile;
a display; and
a processor for controlling the display to display:
a first area including a first tag associated with a first group of video information for a first classification and a second tag associated with a second group of video information for a second classification different from the first classification, the first group of video information being configured to allow a user to edit, wherein the first group of video information and the second group of video information are part of the plurality of stored video information, and a second area displaying thumbnails corresponding to at least a portion of the plurality of stored video information, wherein user selection of the first tag enables the display of a first group of thumbnails corresponding to the first group of video information in the second area, wherein user selection of the second tag enables the display of a second group of thumbnails corresponding to the second group of video information in the second area, wherein, upon one video information stored on the recording medium included in both the first group of video information and the second group of video information being deleted from the first group of video information, the one video information continues to be included in the second group of video information and the processor controls the display to display a thumbnail corresponding to the one video information as one of the second group of thumbnails when the second tag is selected, and wherein the processor generates a folder of second video information based on user preferences determined by a plurality of user selections of the thumbnails displayed in the second area, and wherein, upon user selection of the folder, the processor controls the display to display thumbnails that correspond to the second video information and no other thumbnails associated with video information of other users.

2. The information processing apparatus of claim 1, further comprising:
an antenna for wirelessly receiving the first video information from the other information processing apparatus.

3. The information processing apparatus of claim 1,
wherein the plurality of stored video information includes third video information recorded by the information processing apparatus, fourth video information, and fifth video information,
wherein the display displays a user interface having thumbnails corresponding to each of the third, fourth, and fifth video information, and
wherein the processor generates a list of video information including the third, fourth, and fifth video information based on one or more user selections of the corresponding thumbnails.

4. The information processing apparatus of claim 3,
wherein the third video information, the fourth video information, and the fifth video information are organized in the list of video information to have a playback sequence based on an order selected via the one or more user selections.

5. The information processing apparatus of claim 4,
wherein the display displays the third, fourth, and fifth video information included in the list according to the playback sequence selected by the user.

6. The information processing apparatus of claim 1,
wherein the plurality of stored video information includes third video information, fourth video information, and fifth video information,
wherein the plurality of stored video information includes management information corresponding to the third, fourth, and fifth video information,
wherein the management information includes filename information and timing information for each of the third, fourth, and fifth video information such that when the third, fourth, and fifth video information is stored in the recording medium the filename information is updated according to a predetermined sequence.

7. The information processing apparatus of claim 1, further comprising:
an analog to digital converter for converting analog audio information being recorded into digital audio information;
a compressor for compressing the plurality of video information including digital video information and the digital audio information;
a decoder for decoding, during playback, the compressed digital video information and the compressed digital audio information included in the plurality of stored video information and selected for reproduction by the user; and
a digital to analog converter for converting at least the decoded digital audio information into analog audio information during playback.

8. The information processing apparatus of claim 1, further comprising:
an on screen display generator generating on screen display information, wherein the plurality of stored video information includes third video information such that, upon selection for playback, the third video information is outputted with the on screen display information for display of the third video information and the on screen display information.

9. An information processing method implemented on an information processing apparatus, the information processing method comprising:
storing a plurality of video information including first video information received wirelessly by a network interface over a network from another information processing apparatus, wherein at least some of the plurality of video information is associated with a user profile; and
displaying:
a first area including a first tag associated with a first group of video information for a first classification and a second tag associated with a second group of video information for a second classification different from the first classification, the first group of video information being configured to allow a user to edit, wherein the first group of video information and the second group of video information are part of the plurality of stored video information, and
a second area displaying thumbnails corresponding to at least a portion of the plurality of stored video information,
wherein user selection of the first tag enables the display of a first group of thumbnails corresponding to the first group of video information in the second area, and
wherein user selection of the second tag enables the display of a second group of thumbnails corresponding to the second group of video information in the second area;
upon one video information stored on the recording medium included in both the first group of video information and the second group of video information being deleted from the first group of video information, the one video information continues to be included in the second group of video information, and displaying a thumbnail corresponding to the one video information as one of the second group of thumbnails when the second tag is selected;

generating a folder of second video information based on user preferences determined by a plurality of user selections of the thumbnails displayed in the second area; and upon user selection of the folder, displaying thumbnails that correspond to the second video information and no other thumbnails associated with video information of other users.

10. The information processing method of claim 9, further comprising:

wirelessly receiving the first video information from the other information processing apparatus via an antenna of the information processing apparatus.

11. The information processing method of claim 9, wherein the plurality of stored video information includes third video information recorded by the information processing apparatus, fourth video information, and fifth video information, wherein the information processing apparatus displays a user interface having thumbnails corresponding to each of the third, fourth, and fifth video information, and wherein the information processing apparatus generates a list of video information including the third, fourth, and fifth video information based on one or more user selections of the corresponding thumbnails.

12. The information processing method of claim 11, wherein the third video information, the fourth video information, and the fifth video information are organized in the list of video information to have a playback sequence based on an order selected via the one or more user selections.

13. The information processing method of claim 12, wherein the information processing apparatus displays the third, fourth, and fifth video information included in the list according to the playback sequence selected by the user.

14. The information processing method of claim 9, wherein the plurality of stored video information includes third video information, fourth video information, and fifth video information, wherein the plurality of stored video information includes management information corresponding to the third, fourth, and fifth video information, wherein the management information includes filename information and timing information for each of the third, fourth, and fifth video information such that when the third, fourth, and fifth video information is stored in the recording medium the filename information is updated according to a predetermined sequence.

15. The information processing method of claim 9, further comprising:

converting, by an analog to digital converter of the information processing apparatus, analog audio information being recorded into digital audio information;

compressing, by a compressor of the information processing apparatus, the plurality of video information including digital video information and the digital audio information;

decoding, during playback and by a decoder of the information processing apparatus, the compressed digital video information and the compressed digital audio information included in the plurality of stored video information and selected for reproduction by the user; and converting, by a digital to analog converter of the information processing apparatus, at least the decoded digital audio information into analog audio information during playback.

16. The information processing method of claim 9, further comprising:

generating, by the information processing apparatus, on screen display information, wherein the plurality of stored video information includes third video information such that, upon selection for playback, the third video information is outputted with the on screen display information for display of the third video information and the on screen display information.

17. A method for reproducing video content associated with user profiles being implemented on an information processing apparatus, comprising:

receiving, via a network, first video information wirelessly from a device external to the information processing apparatus, the first video information being received including second video information that is encrypted;

displaying, on a display device, a first user interface for a user to select a user profile from among a plurality of user profiles including a first user profile associated with a first tag and a second user profile associated with a second tag, the plurality of user profiles being associated with video information and the first user interface including an option for a user to select the first user profile from the plurality of user profiles by selecting the first tag;

receiving a selection of the first user profile;

displaying, in response to the selection, a second user interface for a user to select desired video information to be reproduced from among the first video information, the second user interface being associated with the first user profile and displaying the first tag, the first tag associated with a first group of video information and indicating an identity of the user of the first user profile, the second user interface further displaying thumbnails corresponding to the first group of video information;

displaying the second tag and a second group of thumbnails corresponding to a second group of video information associated with the second user profile when the second tag shown in the first user interface is selected, the first group of video information and the second group of video information including one video information that is the same;

receiving a selection to remove the one video information from the first group of video information associated with the first user profile;

removing the one video information from the first group of video information, wherein, upon the one video information being removed from the first group of video information, the one video information continues to be included in the second group of video information for the second user profile and the second group of thumbnails continues to display a thumbnail corresponding to the one video information when the second tag is selected;

receiving a selection of desired video information based on a selection of a thumbnail from the first group of thumbnails, the desired video information included in the second video information;

decrypting video information corresponding to the selected thumbnail; and displaying the decrypted video information.

18. The method of claim 17,
wherein any user can delete stored video information regardless of a user profile from the plurality of user profiles that was used to record the stored video information.

19. The method of claim 17, further comprising:
generating a list of video information based on preferences of a user determined by a plurality of user selections of thumbnails from the first or second group of thumbnails.

20. The method of claim 17, further comprising:
generating a list of video information based on preferences of a user determined by a plurality of user selections of thumbnails associated with the first video information, the list including third video information;
receiving a selection of the list by the user; and
in response to the selection of the list, displaying the thumbnails that correspond to the third video information and no other thumbnails associated with video information of other users.

21. The method of claim 17, further comprising:
displaying a user interface having thumbnails corresponding to each of third video information, fourth video information, and fifth video information;
generating a list of video information including the third, fourth, and fifth video information based on one or more selections of the corresponding thumbnails made by the user;
organizing the third, fourth, and fifth video information in the list of video information with a playback sequence; and
displaying the third, fourth, and fifth video information included in the list according to the playback sequence.

22. The method of claim 17, further comprising:
generating on screen display information, wherein the first video information includes third video information such that, upon selection for playback, the third video information is outputted with the on screen display information for display of the third video information and the on screen display information.

23. An information processing apparatus comprising:
a network interface receiving first video information wirelessly from a device external to the information processing apparatus, the first video information being received including second video information that is encrypted;
a display displaying a first user interface for a user to select a user profile from among a plurality of user profiles including a first user profile associated with a first tag and a second user profile associated with a second tag, the plurality of user profiles being associated with video information and the first user interface including an option for a user to select the first user profile from the plurality of user profiles by selecting the first tag;
an input interface receiving a selection of the first user profile at a first time and a selection of the second tag at a second time,
wherein, in response to the selection of the first user profile, the display displays a second user interface for a user to select desired video information to be reproduced from among the first video information, the second user interface being associated with the first user profile and displaying the first tag, the first tag associated with a first group of video information and indicating an identity of the user which the first user profile is associated with, the second user interface further displaying thumbnails corresponding to the first group of video information, and
wherein, in response to the selection of the second user profile, the display displays the second tag and a second group of thumbnails corresponding to a second group of video information associated with the second user profile when the second tag shown in the first user interface is selected, the first group of video information and the second group of video information including one video information that is the same; and
a processor for removing one video information from the first group of video information after the input interface receives a selection to remove the one video information from the first group of video information associated with the first user profile, wherein, upon the one video information being removed from the first group of video information, the one video information continues to be included in the second group of video information for the second user profile and the second group of thumbnails continues to display a thumbnail corresponding to the one video information when the second tag is selected,
wherein the processor decrypts second video information corresponding to a selected thumbnail when the input interface receives a selection of desired video information based on a selection of a thumbnail from the first group of thumbnails, and
wherein the display displays the decrypted video information.

24. The information processing apparatus of claim 23, further comprising:
an antenna for wirelessly receiving the first video information.

25. The information processing apparatus of claim 23,
wherein any user can delete stored video information regardless of a user profile from the plurality of user profiles that was used to record the stored video information.

26. The information processing apparatus of claim 23,
wherein the processor generates a list of video information based on preferences of a user determined by a plurality of user selections of thumbnails from the first or second group of thumbnails.

27. The information processing apparatus of claim 23,
wherein the processor generates a list of video information based on preferences of a user determined by a plurality of user selections of thumbnails associated with the first video information, the list including third and fourth video information, and, in response to the input interface receiving a selection of the list by the user, the display displays only those thumbnails that correspond to the third and fourth video information and no other thumbnails associated with video information of other users.

28. The information processing apparatus of claim 23,
wherein the display displays a user interface having thumbnails corresponding to each of third video information, fourth video information, and fifth video information,
wherein the third, fourth, and fifth video information are included in the first video information, and
wherein the processor:
generates a list of video information including the third, fourth, and fifth video information based on one or more selections of the corresponding thumbnails made by the user; and organizes the third, fourth, and fifth video information with a playback sequence such that the display displays the third, fourth, and fifth video information included in the list according to the playback sequence.

29. The information processing apparatus of claim 23, further comprising:
   an analog to digital converter for converting analog audio information being recorded into digital audio information;
   a compressor for compressing the first video information;
   a decoder for decoding, during playback, audio and video information included in the first video information and selected for reproduction by the user; and
   a digital to analog converter for converting at least the digital audio information into audio information during playback.

30. The information processing apparatus of claim 23, further comprising:
   an on screen display generator generating on screen display information,
   wherein the first video information includes third video information such that, upon selection for playback, the third video information is outputted with the on screen display information for display of the third video information and the on screen display information.

* * * * *